United States Patent Office 3,406,295
Patented Oct. 15, 1968

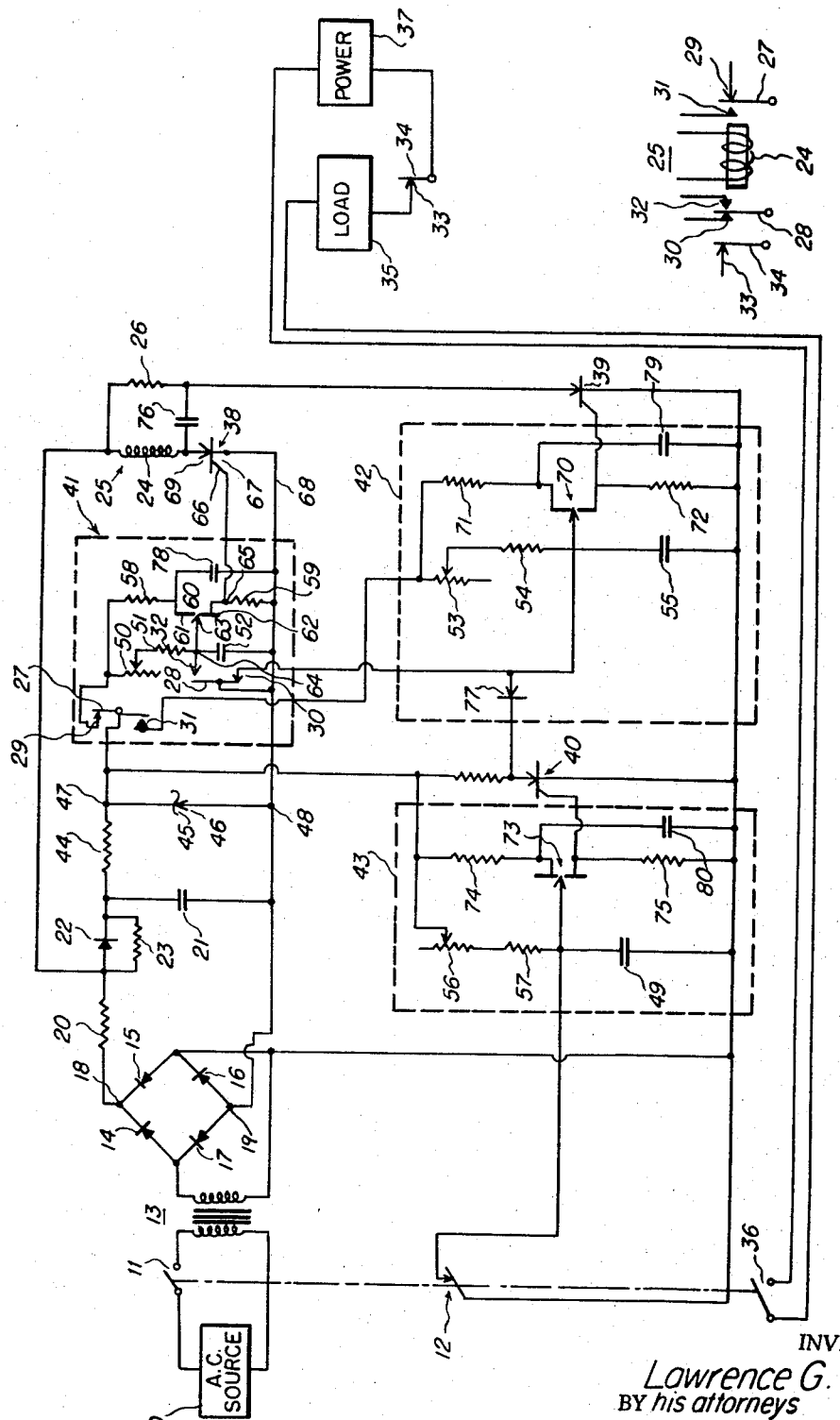

3,406,295
CYCLING ON-OFF ELECTRONIC TIMING SYSTEM
USING ONE RELAY
Lawrence G. Corey, Rockville, Conn., assignor to The
Arrow-Hart & Hegeman Electric Company, Hartford,
Conn., a corporation of Connecticut
Filed July 30, 1965, Ser. No. 476,133
13 Claims. (Cl. 307—132)

ABSTRACT OF THE DISCLOSURE

A solid state control circuit provides for independently adjustable off and on times for actuating a load control relay. A further solid state device retains the relay in the off condition after an adjustably predetermined number of cycles.

---

This invention relates to the control of load circuits and more particularly it relates to the automatic timing of the on and off load conditions and the automatic shut-down of the load.

The invention is a continuation-in-part of my co-pending application Ser. No. 386,008 filed July 29, 1964, now U.S. Patent No. 3,325,657 issued June 13, 1967.

There is disclosed in said prior application a system for controlling the cyclically repetitive on and off periods for a load, and also for controlling the relative durations of the on and off conditions independently of each other. The prior application discloses a system employing a solid state switching and control device but requires the use of three electromagnetic relays or switches and a ring counter to control the various functions.

I have found that such time control and its cyclical repetition rate and complete shunt-down can be achieved by such solid state devices requiring only a single electromagnetic relay.

Accordingly, it is a principal object of this invention to provide a simplified system for controlling the on and off conditions of a load as well as independently controlling the duration of such conditions, and the complete shut-down of the load after a predetermined time which can be manually correlated with the number of on and off cycles.

Another feature relates to a simplified timing system of the general kind disclosed in said prior application but using three distinct timing circuit stages with interstage switching arrangements employing solid state devices, one of the stages controlling in a variable manner the on period for the load, another stage controlling the off period, and a third stage controlling the complete shut-down of the load after a predetermined time. Thus if the duration of either the on and off cycles is reset, the third stage can be reset to a different time duration to effect shut-down of the load for the same number of on and off cycles as before. If the on period and the off period are left unchanged, the number of on and off cycles can be changed by varying the third stage.

A further feature relates to the novel organization, arrangement and relative interconnection of parts which cooperate to provide an improved repetitive cycle load control timing system.

Other features and advantages not specifically enumerated will be apparent after a consideration of the following detailed descriptions and the appended claims.

In the drawing:

FIG. 1 is a schematic wiring diagram of a system embodying features of the invention;

FIG. 2 is an equivalent showing of the single electromagnetic relay of FIG. 1 with its contacts in associated form. In FIG. 1 the contacts are shown in distributed form.

According to the invention the block 10 represents any well-known source of power, for example 110 volts A.C. which is connected in circuit by a suitable normally open switch 11. Switch 11 has its moveable arm mechanically connected to another arm 12 which is in normally closed position. In other words, when switch 11 is open switch 12 is closed and vice versa. The A.C. input is coupled through a suitable step-down transformer 13 to a bridge rectifier network which includes the usual rectifying diodes 14–17. The secondary winding of transformer 13 is connected across one pair of conjugate points of the rectifier bridge and their is produced across the other pair of conjugate points 18, 19 a direct current voltage, for example of 24 volts. This rectified voltage is filtered to reduce varying components or ripples by means of series resistor 20 and shunt condenser 21.

Connected between the resistor 20 and condenser 21 is a parallel path including crystal diode 22 and resistor 23. This parallel path provides a high impedance discharge circuit for the condenser 21 but a low impedance charging path for that condenser. In other words, condenser 21 may be considered as a current storage device which is rapidly charged by the rectified input voltage, but whose discharge current is slowly released. This discharge current, under one operating condition passes through the winding 24 of electromagnetic relay or switch 25 (see FIG. 2); and in another operating condition it includes the resistor 26 as will be described hereinbelow.

As shown in the equivalent structural sketch of FIG. 2, relay 25 has a pair of transfer contacts 27, 28 each of which has a normally closed contact 29, 30 and respective normally open contacts 31, 32. Relay 25 also has an additional set of normally closed contacts 33, 34 which complete the circuit through the load 35 and thence through a manually operable and normally open switch 36 to the load power source 37. Switch 36 can be ganged to switches 11 and 12 except when the power required for load 35 is the same as source 10, in which case switch 36 is not necessary since switch 11 will act to open and close the A.C. power circuit for the timer as well as for the load. The capacity of condenser 21 is chosen with respect to the elements 22 and 23 so that even when the voltage input from the rectifier goes to zero every halfcycle the discharge current is sufficient to hold in conductive condition certain of the solid state switching devices in the form of silicon controlled rectifiers 38, 39, 40. Each of these silicon controlled rectifiers is associated with a respective adjustably settable timing circuit 41, 42, 43. Timing circuit 41 controls the on condition for the load 35; timing circuit 42 controls the off condition for the load, and timing circuit 43 controls the final shut-down of the load after a selectable number of complete on and off load cycles.

In order to assure that a precisely regulated direct current voltage is supplied to the respective timing circuits from the rectifier bridge, it is regulated by a series resistor 44 and a shunt Zener diode 45. Diode 45 is poled as shown with its anode 46 connected to the output point 19 of the rectifier bridge. In the well-known manner, the Zener diode provides a precise stabilization or regulation of the D.C. voltage applied to the timing circuits at the points 47, 48.

When the circuit is in its normal or idle condition, switch 11 is open and switch 12 is closed. In other words, under such condition the timing circuits are quiescent or completely timed out and the storage condenser 49 of timing circuit 43 is completely short-circuited. Each of the timing circuits 41, 42, 43 includes an adjustable charge and discharge path across its input conductors. For example, the timing control for unit 41 includes a potentiometer 50 connected in series with a resistor 51 and the condenser 52. Likewise, the timing control for unit 42 includes potentiometer 53, resistor 54 and condenser 55. In the quiescent condition, the closing of relay contacts 28 and 30 insures that capacitor 55 is fully discharged; the closing of relay contacts 28 and 32 insures that capacitor 52 is fully discharged. The timing control for unit 43 includes potentiometer 56, resistor 57 and condenser 49. Connected in parallel with each of the above timing controls is another control path. For example, in parallel with the elements 50, 51, and 52 is another path comprising resistors 58 and 59 and an intervening unijunction transistor 60, one base of which, namely base 61, is connected to the resistor 58 and the other base of which, namely 62 is connected to resistor 59. The common emitter 63 is connected to the point 64 in the timing control. In the well-known manner normally the impedance between the emitter 63 and the base 62 is a high impedance. However, when the condenser 52 is charged up to a voltage which is approximately half of the voltage between base 61 and base 62, the junction between emitter 63 and base 62 will break down causing that junction to change from its normal high impedance to a low impedance. This provides a low impedance discharge path around the timing condenser 52. The discharge current from condenser 52 flows through resistor 59. The potential at point 65 is connected to the gating electrode 66 of the silicon controlled rectifier 38 whose cathode 67 is connected to the common conductor 68. The anode 69 is connected to one end of relay winding 24, the other end of which is connected to the output of the rectifier bridge. In the well-known manner, such a controlled rectifier has a normal high impedance between its anode 69 and its cathode 38 but when a gating pulse is applied to electrode 66 the rectifier becomes highly conductive between its anode and cathode, thus completing a low impedance path for current flow through the relay winding 24.

The corresponding unijunction transistor for the unit 42 is designated 70 and it is connected to the condenser 55 of unit 42 and in circuit with resistors 71, 72 in a manner similar to that described for unit 41. Likewise, the unijunction transistor 73 and its associated resistors 74, 75 for unit 43 are likewise connected in circuit and perform functions similar to the corresponding elements of unit 41.

When switch 11 is closed to initiate the timing and cycling operation, the condenser 21 rapidly receives its full voltage charge and this charging voltage is applied through the normally closed contacts 27 and 29 of relay 25 and thence through the elements 50, 51 to charge the condenser 52. Dependent upon the setting of potentiometer 50 the voltage on condenser 52 takes a predetermined time to reach a sufficient voltage as above mentioned to break down the emitter-base impedance of transistor 60. At this point in the voltage of point 64 rectifier 38 is triggered on and completes a direct current energizing path from the bridge rectifier through the winding 24 of that relay and thence through the rectifier 38 to the point 19.

When relay 25 operates it opens at its contacts 33, 34 the circuit between the power source and the load, which is thus turned off. It also disconnects the regulated D.C. voltage from unit 41 and applies it through contacts 27, 31, to the timing control elements 53, 54 and 55 of unit 42. After a predetermined time interval, determined by the setting of potentiometer 53, the unijunction transisor 70 becomes conductive and applies a discharge path around condenser 55 and applies a gating pulse to the silicon controlled rectifier 39. That rectifier becomes conductive and provides a shunt path around rectifier 69, and in conjunction with condenser 76 renders rectifier 38 non-conductive. The restoration of relay 25 to its normal condition again connects the regulated D.C. voltage to the unit 41 to repeat the on and off cycle as described. Thus the duration of each on and off condition can be independently adjusted.

After a predetermined number of such cyclical on and off conditions, it is necessary to permanently shut down the load. The unit 43 functions similarly to units 41, 42 except that it can be selectively set to shut down the load after a selected number of complete cycles of operation of units 41, 42. The setting of potentiometer 56 determines the time for shut-down of the load. During the on and off cycles of units 41, 42, switch 11 having been closed and switch 12 having been opened, the shunt circuit around condenser 49 is removed. It should be noted that during the on and off operations the regulated D.C. voltage at point 47 is also applied through elements 56 and 57 to condenser 49 to charge that condenser. There is provided a crystal diode 77 which is connected between the anode of the silicon controlled rectifier 40 and thence to the junction point between resistor 54 and condenser 55. During the periods that the rectifier 40 is non-conductive diode 77 is in a blocking mode. In other words, the voltage at the anode of 40 approaches the Zener voltage which is higher than that to which capacitor 55 will ever rise. When 40 is conducting, the anode of 40 will drop to less than one volt. Therefore capacitor 55 cannot charge to a voltage sufficient to break down the unijunction transistor. Rectifier 40 becomes conductive at the end of the total time corresponding to the number of on and off cycles, diode 77 becomes conductive and discharges condenser 55 through the rectifier 40. In other words, so long as diode 77 is in blocking condition the discharge of condenser 55 is controlled by its unijunction transistor 70. When diode 77 is unblocked after the timing out effect of unit 43, the rectifier 40 remains conductive since it is connected across points 47, 48. This prevents the system re-cycling until the system is reset by the opening of switch 11. This also prevents the unit 42 from completely timing out until reset of the system by the opening of switch 11. Thus at the end of the predetermined number of cycles with switch 11 still closed the original energizing circuit for relay 25 also remains closed since rectifier 39 cannot again become conductive. In other words, the load is permanently disconnected from its power source under those conditions. In order to restart the system for another cycling repetition and shut-down it is necessary to open and re-close switch 11. In order to prevent transient voltages from firing the unijunction transistors 60, 70, 73 they may be provided with respective shunt condensers 78, 79, 80.

What is claimed is:

1. A timer system for cyclically connecting and disconnecting a load from its power source, comprising in combination electronic switch means for effecting a cyclical connection and disconnection, said switch means including a first solid state time delay unit for controlling the on period of said connection in each cycle, a second solid state time delay unit for controlling the off period of said connection during each cycle, a third solid state time delay unit, and circuit connections between said second and third units to prevent said second unit from maintaining the off period continuously until after a predetermined timed interval determined by the third unit.

2. A timer system according to claim 1 in which said third unit has adjustable means to control its timing out independently of the number of the on and off cycles of said first and second units.

3. A timer system according to claim 2 in which the first and second timer units each includes an independently adjustable element whereby the duration of the on and off periods thereof can be controlled independently, and said third unit includes an individual adjusting element whereby said third unit determines the total time before the permanent disconnection of the source from the load and regardless of the setting of the adjusting elements of the first and second units.

4. A timer unit according to claim 3 in which each of the adjusting elements of the three units includes a respective time delay network.

5. A timer system according to claim 4 in which electromagnetic relay switch means is provided for completing the circuit between the power source and load, and circuit connections between the first and second units for controlling the energization of said relay.

6. A timer system for cyclically connecting and disconnecting a power source to and from a load, comprising in combination a source of timing control voltage, a first time delay unit, a second time delay unit, a third time delay unit, each of said units having an independently adjustable timed on and timed out period, manually operable switch means for controlling the application of said control voltage to said units, circuit means responsive to the operation of said switch means to initiate the first and third units to their respective timed on conditions while retaining the second unit in a timed out condition, a relay switch having circuit connections to the first unit to maintain said relay switch normal until said first unit is timed out and for thereupon switching said second unit to its timed on condition, circuit connections between said second unit and said relay switch and effective when said second unit is in its timed on condition to operate said relay switch to disconnect the power source from the load, and for rendering said first and second units cyclically and alternately in their timed on and timed out conditions, and circuit connections between the third unit and the second unit for preventing said second unit from permanently timing out until the third unit arrives at its timed out condition.

7. A timer system according to claim 6 in which each of said timer units includes a resistance-capacitance timing circuit, said relay having a set of contacts connected to the timing circuit for the first and second units whereby when the said relay is in its normal condition it provides a charging path between said source of control voltage and the timing circuit of the first unit and also provides a low resistance shunt to discharge the timing circuit of the second unit.

8. A timer system according to claim 7 in which the timing circuit for the first unit is provided with a normally open discharge path which includes a normally non-conductive solid state switch, and circuit connections between the timing circuit of the first unit and its solid state switch to render said solid state switch conductive to convert the timing circuit of the first unit to a timed out condition and simultaneously to operate said relay switch.

9. A timer system, comprising first, second and third timer units, each having an adjustable timed on period and an adjustable timed off period, a source of control voltage, a load to be switched on and off, a single relay connected to said timer units, said control votlage source and load for starting the timing on of the first unit and responsive to the termination of said timed on period of the first unit for timing on the second unit and simultaneously timing off the first unit, means for starting the timing on of the third unit simultaneously with the timing on of the first unit, electronic switch means for each unit, each such means including a normally non-conductive solid state switch, circuit means controlled by said single relay to alternately and cyclically render said first and second units in a timed on and a timed off condition, and circuit connections between the second and third units to terminate the said cycling of the first and second units when said third unit is in a timed off condition.

10. A timer system according to claim 9 in which each of said electronic switches includes a pulse controlled solid state switch which is normally non-conductive and an associated unijunction transistor which is also normally non-conductive but which becomes conductive when the associated timer unit is in a timed off condition.

11. A timer system according to claim 10 in which the said single relay is connected in series between said source of voltage and the pulse controlled electronic switch of the first unit to maintain said single relay operated when said first unit is in a timed off condition, and circuit connections between the second unit and said relay to restore said single relay to normal when said second unit is in a timed on condition.

12. A timer system comprising a first solid state timer unit, a second solid state timer unit, a source of timing control voltage for said units, a single relay connected to said first and second timer units and said control voltage source for alternately and cyclically connecting said first and second units to said source, a third solid state timer unit for determining the duration of cyclical operation of the first and second units, and circuit connections between the third unit and the second unit to terminate the cycling of the first and second units after a predetermined time interval controlled by said third unit.

13. A timer system according to claim 12 in which each of said units has an independently adjustable time delay for determining the duration of the on and off periods of each unit.

References Cited

UNITED STATES PATENTS

| | | | |
|---|---|---|---|
| 3,082,357 | 3/1963 | Braverman | 317—141 |
| 3,124,722 | 3/1964 | Steiner. | |
| 3,209,175 | 9/1965 | Deeg | 317—148.5 XR |
| 3,252,052 | 5/1966 | Nash | 317—148.5 X |
| 3,303,396 | 2/1967 | Culbertson | 317—148.5 X |
| 3,321,674 | 5/1967 | Felcheck et al. | |
| 3,325,657 | 6/1967 | Corey | 307—141 X |

ROBERT K. SCHAEFER, *Primary Examiner.*

T. B. JOIKE, *Assistant Examiner.*